United States Patent Office 3,482,236
Patented Dec. 2, 1969

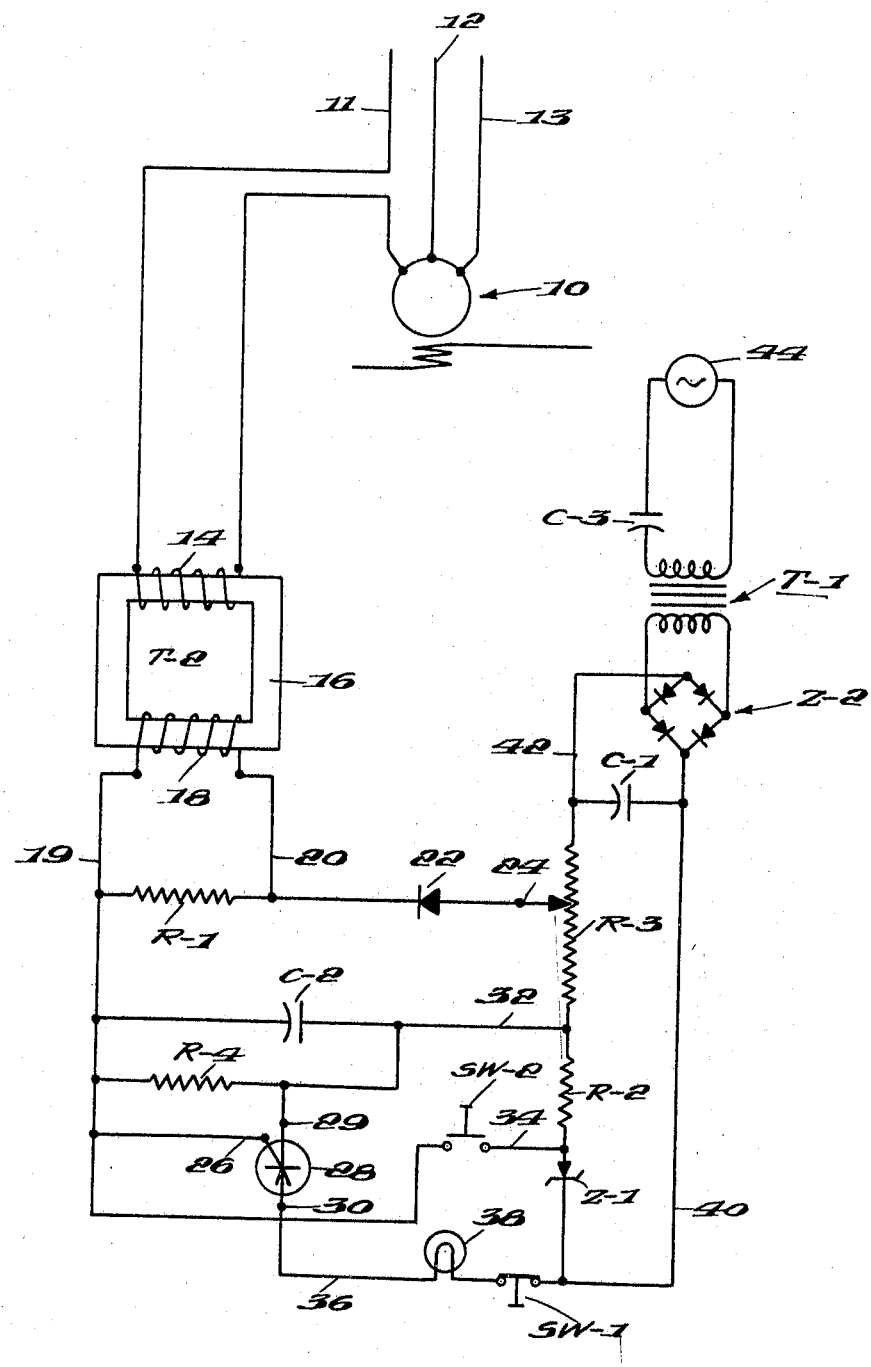

3,482,236
OVERLOAD DETECTION AND INDICATION
John Seymour Seney, Seaford, Del., assignor to E. I. du Pont de Nemours and Company, Wilmington, Del., a corporation of Delaware
Continuation-in-part of application Ser. No. 497,790, Oct. 19, 1965. This application July 5, 1966, Ser. No. 562,548
Int. Cl. G08b 21/00; H03k 5/20, 17/00
U.S. Cl. 340—248          5 Claims

ABSTRACT OF THE DISCLOSURE

A detector and indicator of transient overload on a synchronous motor. The primary of a current transformer is in one motor supply line and its secondary is coupled to the gate of a controlled rectifier which, in turn, is in series with a DC supply and an overload indicator.

---

This is a continuation-in-part of my copending application Ser. No. 497,790, filed Oct. 19, 1965, now U.S. Patent No. 3,378,744. The invention relates generally to overload indicators for synchronous electric motors and, more specifically, to an auxiliary circuit for detecting and indicating incipiency or occurrence of pullout from synchronous speed.

Many industrial processes depend on maintenance of constant operating speeds for extended lengths of time to achieve the production of a uniform end product. For example, high speed production of synthetic polymeric filaments requires precise regulation of draw roll speeds. Electric motors operated at synchronous speed often are used for the purpose and are regulated by controlling the frequency of the alternating current (AC) supply. It has been found that gradual or sudden increases in the torque demanded by the process may cause the driving motor to slip and pullout from synchronous speed. When the torque requirements decrease toward normal magnitude, the motor may return again to synchronous speed. Such speed deviations often effect undesirable variations in certain properties of the product produced. It is essential, therefore, that transient speed changes be detected and signalled to an operator so that defective production can be segregated.

Many motor control systems are known which detect pullout from synchronous speed and then either adjust field excitation in order to bring the motor back to synchronous speed when the overload condition has been corrected or shut down the motor in case of excessive overload. Tachometers and other types of speed indicators are also available. Such detection, control and indication systems either lack the necessary precision, are excessively costly, require excessive space, or are too complicated for the simple indication of transient deviations from synchronous speed.

Some of the known control systems employ a current transformer in one supply wire to a three-phase synchronous motor to actuate a pullout relay upon occurrence of gross deviation from synchronous speed (U.S. Patent 1,896,074). Others employ a similar current transformer together with connections to two of the three supply wires to actuate a power factor relay or similar phase sensitive device upon occurrence of gross pullout from synchronous speed (U.S. Patent 3,145,332). None of these systems has a highly sensitive overload detector which is adjustable to enable detection of incipient deviations from synchronous speed. Similarly, none provides a continuing indication following a transient overload condition.

According to this invention, torque demands on a synchronous motor are monitored by providing a unique detection circuit which has a current transformer associated with one of the supply wires and coupled to the gating terminal of a silicon controlled rectifier (SCR). In addition, a potentiometer has its movable contact coupled to the gating terminal. The SCR has anode and cathode terminals connected in series with the potentiometer, an overload indicator and a source of direct current.

Other objectives and advantages will be apparent from the following description wherein reference is made to the accompanying drawing in which a preferred embodiment has been illustrated schematically.

In the drawing, an overload detection circuit has been shown in association with a synchronous induction motor 10 of the type disclosed by Bauer et al. in U.S. Patent 2,733,362. Power for motor 10 is received from a three-phase AC power supply over wires 11, 12, 13 in a conventional manner, except for the fact that the primary winding 14 of current transformer T-2 is series connected in wire 11. Transformer T-2 also has a core 16 and a secondary winding 18. Wires 19, 20 connect secondary winding 18 to a resistor R-1. Wire 20 extends to the cathode of a rectifier diode 22 which has its anode connected to the variable contact 24 of a potentiometer R-3. Wire 19 is connected to one side of capacitor C-2, to one side of resistor R-4, to the gating terminal 26 of SCR 28 and to one side of a normally open push button switch SW-2. The cathode 29 of SCR 28 is connected to the other side of resistor R-4, to the other side of capacitor C-2 and is further extended over wire 32 to one terminal of potentiometer R-3. This latter terminal of R-3 is connected through a resistor R-2 and over wire 34 to the second terminal of switch SW-2. Resistor R-2 is also connected to the anode of Zener diode Z-1. The anode 30 of SCR 28 is connected over wire 36 to an indicator lamp 38 and thence to one terminal of a normally closed push button switch SW-1. The other side of SW-1 is connected to the cathode of diode Z-1.

In an actual embodiment, motor 10 is an Allis Chalmers Co. "Synduction" motor, Type GKM-SYN. Transformer T-2 was made from an Indiana General ferramic core, Type CF-606. Primary winding 14 has seven turns of No. 12 AWG wire and secondary winding 18 is a Telechron clock coil, Type 48W, containing 9,230 turns. Component R-1 is an 80 ohm, ½ w., 5% IRC resistor. Diode 22 is a Type IN-2069 and component R-3 is a 50 ohm, wire wound, CTS potentiometer. Capacitor C-2 is a 5 mfd., 10 v., "Olson Electronics" C-966; resistor R-4 is a 2,500 ohm, ½ w., IRC; SCR 28 is a General Electric C-6U; lamp 38 is a "Los Angeles" type 6 lamp No. 11; switch SW-1 is a normally closed "Grayhill" 30-6; Switch SW-2 is a normally open "Grayhill" 30-3; diode Z-1 is an "IR"-IN-1521A Zener diode; and resistor R-2 is a 30 ohm, ½ w., IRC 5% resistor.

A wire 40 from the junction between diode Z-1 and switch SW-1 extends to one output side of full wave rectifier Z-2. The other output side of receifier Z-2 is connected over a wire 42 to the remaining side of potentiometer R-3. A capacitor C-1 is connected between lines 40 and 42. The input terminals of rectifier Z-2 are connected to the secondary of transformer T-1. The primary of transformer T-1 is connected to a conventional 110 volt, 60 cycle power supply 44 with capacitor C-3 in series with one connection.

In the actual embodiment mentioned above, component Z-2 is a Motorola MDA-920-4 full wave rectifier and C-1 is a 250 mfd. 25 v. "Cornell-Dubilier" BR-250-25. Component T-1 is a "Lafayette" Argone No. 103 transformer.

In operation, power from AC source 44 is rectified in bridge Z-2 to produce a direct current (DC) supply across the series combination of potentiometer R–3, resistor R–2 and Zener diode Z–1. This DC supply is smoothed by capacitor C–1 and clipped by diode Z–1. Capacitor C–3 acts as a buffer to soften the output of transformer T–1 so that the Zener regulator Z–1 can act on the total output of rectifier Z–2 with minimum effect due to the current through resistor R–2 and potentiometer R–3. Thus, there is provided a reference DC potential between wire 32 and the adjustable contactor 24. In addition, rectifier Z–2 furnishes direct current power to lamp 38 through switch SW–1 and SCR 28 when the latter is in conducting position.

SCR 28 is switched on whenever the gating signal across terminals 26, 29 reaches a critical level. This gating signal is the potential across resistor R–4 which is the combination of the reference DC signal on contactor 24 and the signal appearing across resistor R–1. This latter signal results from potential induced in secondary 18 by current flowing through primary 14 of current transformer T–2 and therefore depends on the current flowing in wire 11 to synchronous motor 10. The current flowing in wire 11 (and therefore primary 14) depends on the load imposed upon motor 10. With an increased load, this current rises, causes an increased signal across resistor R–1 and therefore increases the signal to the gating terminal of SCR 28.

Potentiometer contact 24 is adjusted to a position such that, when motor 10 is running at synchronous speed, the voltage drop across R–4 is insufficient to gate the SCR. When motor 10 starts to pull out from synchronous speed, the increased signal across R–1 when combined with the DC reference signal from potentiometer R–3 rises to a level sufficient to gate the SCR.

Capacitor C–2 is provided to filter out high frequency harmonics sometimes found in square wave signals from solid state power supplies of the type frequently used to drive synchronous motors.

Since DC is applied between anode 30 and cathode 29 of SCR 28, it will remain switched on, once gated, thus leaving light 38 energized even though the current in primary 14 and therefore the voltage across R–1 drops below a critical level required in gating the SCR. Therefore switch SW–1 is provided so that the SCR can be disabled and thereby reset and readied for detection of another overload condition.

To facilitate checking operation of the SCR and lamp 38, a branch circuit comprising switch SW–2 and wire 34 is provided. The value of resistor R–2 is selected such that when switch SW–2 is closed, the drop across resistor R–2 is sufficient to gate the SCR.

Only minor modifications are required to equip conventional motors with the necessary connections. When so connected, the auxiliary circuit disclosed herein presents a convenient indication of torque requirements above a preselected critical level. The movable contactor of a potentiometer presents an easy route for adjustment of that level. Once energized, the indicator remains on even though the load on the motor is returned to a normal level. For example, in one application it was found that the torque at which the motor pulled out from synchronous speed was 12 inch pounds. In this case, potentiometer R–3 was set such that the detector circuit would trip and turn on the lamp when the torque load on the motor rose to 11.9 inch pounds. For this motor, normal load torque was found to be approximately 9 inch pounds. Of course, potentiometer R–3 could also be adjusted to postpone tripping of SCR 28 until after pullout from synchronous speed.

Having thus described the invention, what is claimed as new and desired to be secured by Letters Patent is:

1. In combination with a synchronous motor supplied from a multi-wire source, an overload detection circuit comprising: a transformer associated with one of said supply wires; and SCR having a gating terminal coupled to said transformer; a potentiometer having a movable contact coupled to said gating terminal, said SCR also having anode and cathode terminals; an electrical indicator; and a DC source, said DC source, potentiometer and indicator being series connected between the anode and cathode terminals of said SCR.

2. The combination of claim 1 wherein said transformer has a primary winding series connected in one of said wires and a secondary winding coupled to said gating terminal.

3. The combination of claim 2 wherein said indicator is a lamp and wherein is provided a normally closed switch in series with the lamp and said DC source for disabling and resetting the SCR.

4. The combination of claim 3 wherein is provided a resistance across said secondary winding and wherein said moveable contact is coupled with the gating terminal through said resistance.

5. The combination of claim 4 wherein is provided a normally open switch connected between said DC source and the gating terminal for checking the operation of said SCR.

References Cited

UNITED STATES PATENTS

| | | | |
|---|---|---|---|
| 3,313,984 | 4/1967 | Hupp | 307—235 XR |
| 3,320,473 | 5/1967 | Grafham | 307—252 XR |

JOHN W. CALDWELL, Primary Examiner

DANIEL MEYER, Assistant Examiner

U.S. Cl. X.R.

307—235, 252; 318—490; 340—253